INVENTOR
JOHANN UTTENTHALER

INVENTOR
JOHANN UTTENTHALER
BY

# United States Patent Office 3,522,952
Patented Aug. 4, 1970

3,522,952
TOBOGGAN OR SLED
Johann Uttenthaler, 22 Georgen Schweigstr.,
8 Munich 13, Germany
Filed Mar. 19, 1969, Ser. No. 808,504
Int. Cl. B62b 15/00
U.S. Cl. 280—12
15 Claims

ABSTRACT OF THE DISCLOSURE

A toboggan or sled having a bottom gliding surface which terminates, at its trailing end, in a relatively sharp edge. The operator sits on the trailing end of the sled above the trailing edge. The sled may be braked, during a downhill run, by pivoting its forward end upwardly and about the sharp trailing edge to cause the edge to bite into the snow or ice. Pivoting of the sled by the operator is facilitated by a lever secured to the forward end of the sled and which extends upwardly between the operator forwardly extending legs. Steering of the sled is facilitated by lateral pressure applied to the lever.

BACKGROUND OF THE INVENTION

My invention relates to sleds, toboggans and the like and, more particularly, to a sled which may be easily controlled in steering and in braking.

A wide variety of sleds or toboggans have been suggested and employed in the prior art for gliding downhill along a relatively smooth surface such as snow or ice. One of the most common types of sleds employ a surface for supporting the operator and laterally spaced runners extending downwardly from the underside of the supporting surface. The runners generally are of a considerable height so that the supporting member is spaced well above the snow. Such sleds are difficult to control in that they exhibit poor braking characteristics and their speed cannot be controlled readily. Considerable practice is required in operating such sleds in order to prevent them from overturning. The likelihood of capsizing the sled is enhanced further by reason of the fact that the runners are of considerable height so that supporting member is disposed well above the snow. Additionally, these sleds are expensive to manufacture, are somewhat bulky and may not be transported conveniently to or from the sledding area.

Another type of sled consists of a hollowed disk having a convex bottom gliding surface. The operator sits in the hollow of the disk and openings for handles or loops are provided at the upper edge or within the hollow of the disk to provide a handgrip for the operator. The operator's legs stretch over the edge of the disk and are employed for steering and braking. Although these disk-shaped sleds are advantageous in that they may be manufactured at relatively low cost and occupy little space, which facilitates their storage or transportation, they display relatively poor steering and braking characteristics in that the disk may begin to spin about its central axis thereby improperly orienting the operator and making leg steering practically impossible. Additionally, it frequently is difficult to grip securely the handles or openings of the disk, particularly when sledding over uneven terrain.

Still another type of sled known to the prior art employs a hollow body closed on all sides and having a continuous, closed bottom gliding surface. Handles are provided on each side of the sled. The interior of these sleds may be filled with compressed air. The primary advantage of these sleds lies in their light weight. These sleds, however, are steered by a technique which requires that the driver shift his weight or drag his feet. Additionally, it is difficult to control or change the downhill speed of these sleds and, in order to stop or slow the downhill speed of the sled the operator must dig his feet firmly into the ground.

It is among the primary and general objects of my invention to provide a sled which is of light weight, compact and durable construction and which overcomes a number of the difficulties inherent in prior sleds. More particularly, it is among the objects of my invention to provide a sled or toboggan which may be steered simply and effectively and, in addition, which may be braked, without relying primarily on the use of the operator's feet. This sled is advantageous particularly in that it may be brake effectively to control or regulate its downhill speed on hard ice as well as relatively soft snow.

SUMMARY OF THE INVENTION

In brief, the sled is of a one-piece construction and has a continuous, bottom, gliding surface which terminates, at its trailing end, in a relatively sharp trailing edge. The operator is intended to sit in a hollowed seat formed on the upper surface of the sled in proximity to its trailing end. A lever, secured to the sled, is located forwardly of the hollow seat and extends upwardly therefrom to enable the operator to grip the upper end of the lever and apply pressure to the lever, as described below, to control the steering and braking action of the sled. The forward end of the bottom gliding surface of the sled is curved upwardly and smoothly to enable the bottom surface to glide smoothly over any irregularities presented on the downhill terrain.

In using the sled, the operator is seated above the sharp trailing bottom edge of the sled with his legs extending forwardly with the lever protruding upwardly between his legs. The operator's feet may protrude forwardly beyond the leading end of the sled and may be employed to supplement the braking and steering action of the sled if desired. It should be noted, however, that in most cases such supplementary action by the operator's feet will be unnecessary. The operator may steer the sled by applying a lateral pressure to the lever. Additionally, the downhill speed can be controlled, even on steep terrain by applying a rearward pressure on the lever (by urging the lever rearwardly toward the operator). By applying rearward pressure to the lever, the forward end of the sled tends to pivot upwardly about the bottom trailing edge which causes that edge to dig firmly into the snow or ice and brake the sled. The speed may be controlled by varying the rearward pressure on the lever which, in turn, will vary the extent of rearward pivoting of the sled and, consequently, the degree to which the sharp trailing edge bites into the snow or ice.

The objects and advantages of my invention will now be described more fully and in greater detail with reference to the accompanying drawings wherein.

Figure 1:
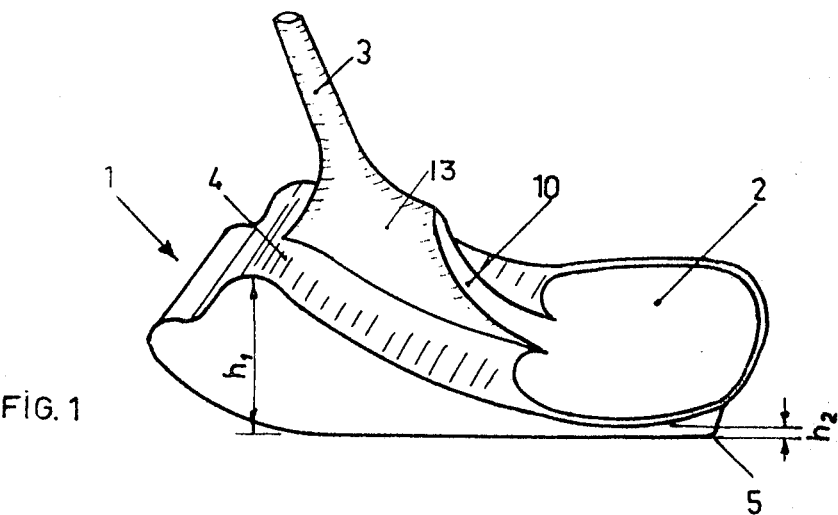
FIG. 1 shows the sled in perspective.
Figure 2:
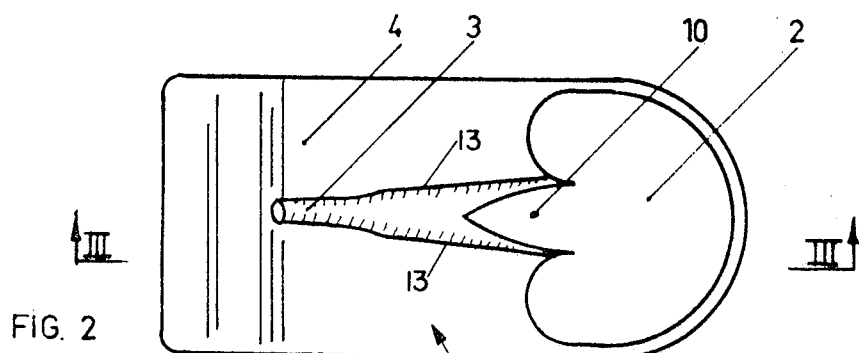
FIG. 2 is a plan view of the sled.

As shown in the accompanying drawings, the thickness or height of the sled body 1 is greater at its forward end (as indicated by the dimension $h_1$). The dimension $h_2$ preferably is maintained as small as is practicably possible. The sled body 1 includes an upper surface 11 and a bottom gliding surface 12 which, during operation, engages fully and continuously the surface over which the operator is sledding. A hollowed seat 2 is formed at the upper surface 11 immediately above the gliding surface 12 and at the trailing end of the sled so that when the operator is seated properly, his weight will be disposed substantially over the rearward end of the sled, for a purpose described below. A pillow may be provided in the hollow for the operator's comfort. A control lever 3 is secured rigidly to or formed integrally with the body 1 of the sled and is located forwardly of the seat hollow 2 along the longitudinal axis of the sled. The lever 3 extends upwardly from the sled and, preferably, is tilted forwardly. The lower portion of the lever is of enlarged dimensions to defined a hump 10 having sides 13. When the operator is seated properly on the sled, the hump 10 will be located between his legs so that, in addition to his manual grip on the upwardly protruding lever 3, the operator may press the sides 13 of the hump 10 between his legs to effect an additional grip on the sled. By gripping the sled both by the hands and legs, the likelihood of the operator sliding or falling from the sled, particularly when gliding over rough terrain, is reduced materially.

Figure 6:
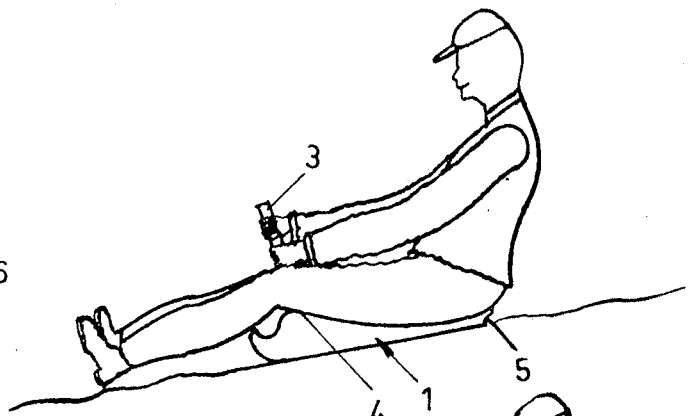
FIG. 6 illustrates the use of the sled while gliding downhill.
Figure 7:
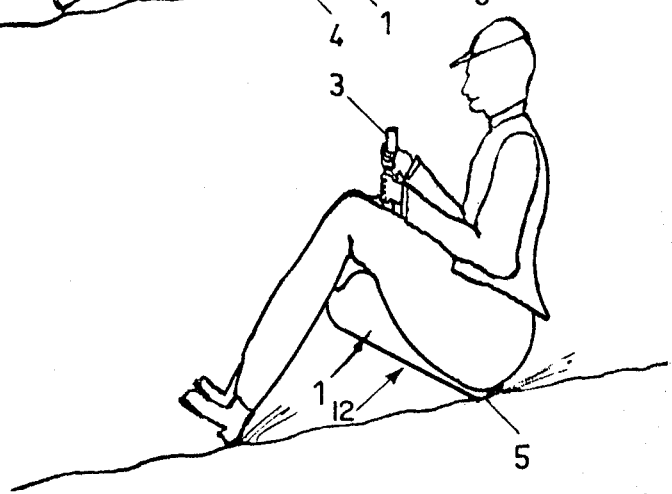
FIG. 7 illustrates the manner by which the sled is braked.

The bottom, gliding surface 12 of the sled, terminates at its rearward end, in a relatively sharp trailing edge 5 which facilitates braking or regulating the speed of the sled. When gliding downhill, as shown in FIG. 6, the trailing edge 5 does not dig or bite into the surface of the snow. When it is desired to brake or slow the sled, rearward pressure (toward the operator) is applied to the lever 3 as shown in FIG. 7. Because the operator when properly seated is disposed substantially above the trailing edge 5, his weight will not retard the upward pivoting of the forward end of the sled. The rearward pressure applied to the lever 3 causes the forward end of the sled to pivot upwardly about the trailing edge 5 which remains in contact with the snow. This causes the sharp trailing edge 5 to dig or bite into the surface of the snow which brakes the sled. The degree of braking is proportional to the extent to which the lever 3 and sled body 1 is rotated rearwardly in that a slight rearward pressure will cause a slight braking effect and an increased rearward pressure on the lever will effect a correspondingly greater braking force.

Figure 3:
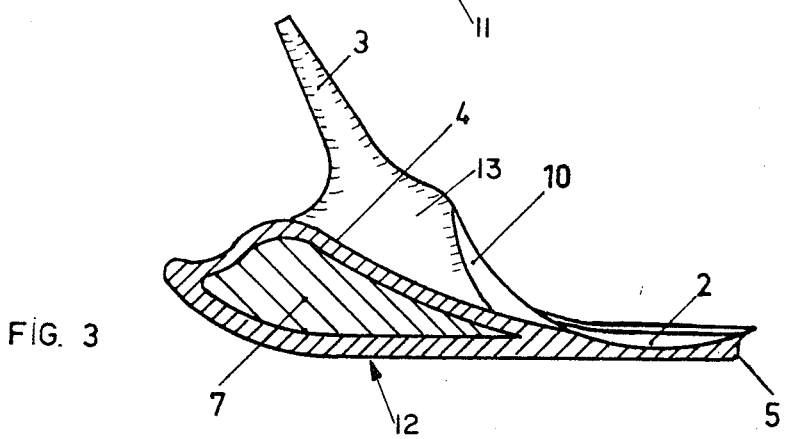
FIG. 3 is a side elevation, in section, as viewed from the line 3—3 of FIG. 2.

It is preferable to construct the sled so that the lever 3 is inclined forwardly with respect to the sled as shown in FIGS. 1 and 3. Thus, when the operator applies a rearward pressure to the lever 3 to pivot the sled rearward (as shown in FIG. 7), the lever 3, will be disposed in a substantially vertical orientation and will not extend toward the operator. It will be appreciated that if, during braking, the lever 3 extended toward the operator it would be difficult for him to maintain a firm grip on the lever. The lever would tend to slip forwardly out of the operator's hands.

The upper end of the lever 3 may be tapered or an alternative construction (shown in FIG. 5) may be employed in which a pair of prongs 6 are provided to enable the operator to grip each of the prongs 6 with one hand and provide a better grip for steering. The upper end of the lever 3 may be provided, alternatively, with ring-shaped member (not shown) which the operator also may grip with both hands.

An additional feature of my invention resides in the provision of a supporting hump 4 of enlarged height $h_2$ on both sides of the lever 3. The support hump 4 serves to support the operator's thighs in such a way that his feet protrude forwardly beyond the sled and are in a comfortable position for steering in the usual way with the heels of the feet (if desired), the operator's legs being slightly bent at his knees. It should be noted, however, that in most instances the operator may control the sled without using his feet. It has been found that, even on steep downhill terrain, the sled may be slowed from a maximum speed to a complete standstill solely by reason of the cutting of the sharp, trailing edge 5 of the sled. The speed of the sled may be increased, from the braking position, by releasing the rearward pressure on the lever 3 to enable the sled to pivot again forwardly.

Figure 4:
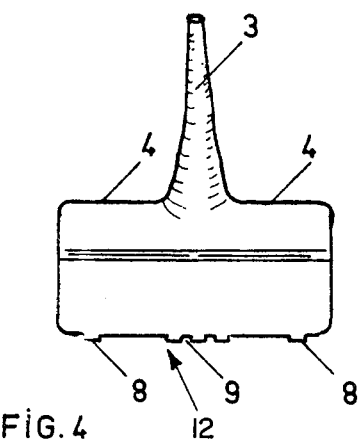
FIG. 4 is a front elevation of the sled.
Figure 5:
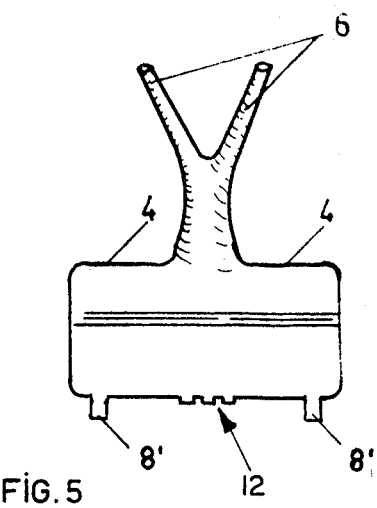
FIG. 5 is a front elevation of a modified form of the sled.

The capability of the sled to track in a straight line is enhanced by the provision of ribs 8 which are formed longitudinally along the bottom gliding surface 12 of the sled. The ribs 8 are separated by grooves 9 as shown in FIG. 4. The outwardmost ribs 8' as shown in FIG. 5, may extend downwardly to a greater extent below the bottom surface than the more internal ribs, if desired.

In fabricating a sled of the type described, the body 1, lever 3 and other elements may be formed from a single, unitary material and, for example, may be molded from plastic. It is preferable that the rearward, trailing edge 5 be of a wear resistant, relatively hard material capable of withstanding repeated braking action. This material may be the same material as that from which the sled is fabricated. It should be noted that the internal portion of the sled need not be fabricated from the same material as the exterior portions thereof. Thus, as shown in FIG. 3, an internal core 7 may be formed from a lighter, less dense material about which the exterior, more wear-resistant sled body 1 is formed. This type of construction results in a lighter sled which enhances its portability.

By way of example, I have found that in constructing such a sled, it is desirable to maintain a dimensional ratio between its length and width (hereinafter referred to as the "aspect ratio") of the order of approximately 1.5 to 2.

It may now be seen that I have provided a compact, light weight sled or toboggan which may be braked and steered effectively without requiring continual use of the operator's feet and which may be manufactured simply and economically. Additionally, the sled displays excellent tracking properties and includes means by which the operator may grip the sled both by his hands and by his legs to insure a firm grip on the sled and reduce the likelihood of his becoming dislodged during sledding.

It should be understood that the foregoing description is intended merely to be illustrative of my invention and that other modifications and embodiments thereof will be apparent to those skilled in the art.

Having thus described my invention what I desire to secure and claim by Letters Patent is:

1. A sled having a continuous bottom gliding surface comprising:
   seating means for enabling an operator to be seated on the upper surface of said sled in proximity to the rearward, trailing end thereof;
   said bottom gliding surface terminating in a relatively sharp, trailing edge;
   a lever secured rigidly to said sled forwardly of said seating means, said lever extending upwardly from said sled so that it may be gripped by said operator, thereby to enable said operator to steer said sled by applying lateral pressure to said lever and to effect braking of said sled by applying a rearward pressure to said lever to cause said trailing edge to bite into the surface over which said sled is gliding.

2. A sled as defined in claim 1 further comprising:
   an enlarged hump formed about the lower region of said lever and extending upwardly from said sled to enable said hump to be disposed and be gripped between the operator's legs.

3. A sled as defined in claim 1 wherein said lever is tapered upwardly.

4. A sled as defined in claim 1 wherein the upper end of said lever is bifurcated.

5. A sled as defined in claim 1 wherein the upper end of said lever is ring-shaped.

6. A sled as defined in claim 1 further comprising:
   a support hump of enlarged heightwise dimensions, said hump extending upwardly above the level of said seat and being disposed in substantial alignment in said lever, said support hump being adapted to support the thighs of said operator.

7. A sled as defined in claim 1 further comprising: said bottom gliding surface having longitudinal ribs formed thereon and extending downwardly therefrom, said ribs being separated by grooves and being effective to enhance the tracking characteristics of said sled.

8. A sled as defined in claim 1 wherein the aspect ratio thereof is approximately 1.5 to 2.

9. A sled as defined in claim 1 wherein said sharp, trailing edge is formed from a relatively hard, wear resistant material.

10. A sled as defined in claim 1 further comprising: a pillow disposed in said seat hollow for the operator's comfort.

11. A sled as defined in claim 1 wherein said seat hollow is immediatey above saild gliding surface.

12. A sled as defined in claim 1 wherein said lever is tilted forwardly.

13. A sled as defined in claim 12 further comprising; an enlarged hump formed about the lower region of said lever and extending upwardly from said sled to enable said hump to be disposed and be gripped between the operator's legs.

14. A sled as defined in claim 1 wherein said sled comprises an internal core formed from a relatively light material and wherein the remaining, exterior portions of said sled are formed from a more dense, wear resistant material.

15. A sled as defined in claim 14 wherein said sharp, trailing edge is formed integrally with and from the same material as said exterior potrions thereof.

References Cited

UNITED STATES PATENTS

| 1,706,568 | 3/1929 | Dunn | 280—18 |
|---|---|---|---|
| 1,954,830 | 4/1934 | Richards | 188—8 |
| 2,219,905 | 10/1940 | Prickman | 280—12 |
| 2,829,902 | 4/1958 | Stocker | 280—18 |
| 2,950,923 | 8/1960 | Forney | 280—12 |
| 3,034,799 | 5/1962 | Conover | 280—18 |
| 3,139,287 | 6/1964 | Annis | 280—12 |
| 3,294,410 | 12/1966 | Tomasino | 280—12 |
| 3,378,274 | 4/1968 | Poppen | 280—18 |

FOREIGN PATENTS 116,660   1/1968   Norway.

LEO FRIAGLIA, Primary Examiner

L. J. PAPERNER, Assistant Examiner

U.S. Cl. X.R.

188—8